United States Patent [19]

Ermanis et al.

[11] 3,898,141

[45] Aug. 5, 1975

[54] ELECTROLYTIC OXIDATION AND ETCHING OF III-V COMPOUND SEMICONDUCTORS

[75] Inventors: Felix Ermanis, Summit; Bertram Schwartz, Westfield, both of N.J.

[73] Assignee: Bell Telephone Laboratories, Incorporated, Murray Hill, N.J.

[22] Filed: Feb. 8, 1974

[21] Appl. No.: 440,656

[52] U.S. Cl. ............ 204/129.43; 156/17; 204/32 S; 204/129.2

[51] Int. Cl. ............ B23p 1/00

[58] Field of Search .......... 204/32 S, 129.1, 129.43, 204/129.2

[56] References Cited

UNITED STATES PATENTS

| | | | |
|---|---|---|---|
| 2,871,174 | 1/1959 | Turner | 204/129.43 X |
| 3,297,555 | 1/1967 | Rerat | 204/129.43 |
| 3,689,388 | 9/1972 | Diepers et al | 204/129.43 |
| 3,798,139 | 3/1974 | Schwartz | 204/56 R |
| 3,798,141 | 3/1974 | Yahalom | 204/129.43 |

OTHER PUBLICATIONS

J. Electrochem. Soc., Vol. 119, Aug. 1972, pages 1063, 1068.

Electrochimica Acta, Vol. 13, pages 1299–1310, (1968).

J. Electrochem. Soc., Vol. 105, pages 402–408, (1958).

J. Electrochem. Soc., Vol. 116, pages 1347–1351, (1969).

J. Electrochem. Soc., Vol. 114, pages 472–478, (1967).

*Primary Examiner*—John H. Mack
*Assistant Examiner*—Aaron Weisstuch
*Attorney, Agent, or Firm*—L. H. Birnbaum

[57] ABSTRACT

A method for oxidation and etching of a III–V compound semiconductor in a single solution. The semiconductor is made the anode in an electrolytic cell wherein the electrolyte is water raised to a pH of 8 or above by a source of hydroxyl ions such as $NH_4OH$. When an appropriate electric field is established in the cell, an oxide is grown into the surface of the semiconductor. Then the field is lowered or turned off and the oxide dissolves faster than it is grown resulting in an etching of the semiconductor material previously consumed in forming the oxide. The method permits electrochemical thinning of a semiconductor layer for such uses as FETS and IMPATTS and further allows formation of passivating layers on etched surfaces in situ.

11 Claims, 7 Drawing Figures

ELECTROLYTIC OXIDATION AND ETCHING OF III-V COMPOUND SEMICONDUCTORS

BACKGROUND OF THE INVENTION

This invention relates to a method of sequentially oxidizing and etching a III-V compound semiconductor in a single solution.

During some semiconductor device processing, it is necessary to form an oxide on a surface and also to etch the same surface of a semiconductor wafer. For example, in the fabrication of some GaAs stripe geometry lasers, a mesa is formed to define the active region by etching the surface of the semiconductor. It is then desirable to form an oxide layer over the resulting structure to passivate the exposed p-n junction. It has also been recently discovered that layers of semiconductor material can be precisely tailored according to desirable electrical characteristics by sequentially oxidizing and dissolving the oxide in order effectively to etch the semiconductor material. Such a procedure is useful, for example, in achieving a uniform pinch-off voltage in FETS and a uniform breakdown voltage in Hi-Lo IMPATTS. (For a full discussion of this procedure, see U.S. patent application of DiLorenzo, Niehaus, Rode and Schwartz Ser. No. 440,664 filed on an even date herewith and assigned to the same assignee.) In such processes, it would be more convenient and economical to be able to perform both oxidation and etching in a single solution. In addition, the semiconductor would be less susceptible to contamination from the outside ambient in such instance.

SUMMARY OF THE INVENTION

In accordance with the invention, oxidation and etching of a III-V compound semiconductor may be performed in situ in the same solution. The semiconductor is made the anode in an electrolytic cell wherein the electrolyte is water with a source of hydroxyl ions sufficient to raise the pH of the solution to at least 8. In one embodiment, initially supplying a first appropriate potential to the cell causes an oxide to grow into the surface of the semiconductor. Thereafter, the applied potential is dropped below the initial value or turned off whereby the oxide is dissolved and the semiconductor material previously consumed by the oxide removed. This procedure of sequential oxidation and etching may be repeated several times according to specific needs.

BRIEF DESCRIPTION OF THE DRAWING

These and other features of the invention are delineated in detail in the description to follow. In the drawing.

DETAILED DESCRIPTION OF THE INVENTION

Figure 1:
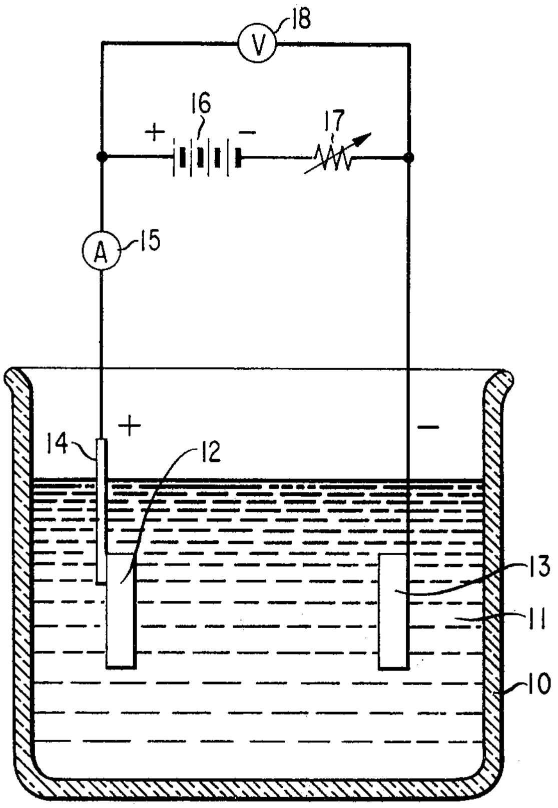
FIG. 1 is a schematic illustration of an electrolytic system utilized in accordance with one embodiment of the invention.

The electrolytic system utilized in accordance with one embodiment of the invention is shown schematically in FIG. 1. Within an ordinary suitable container 10 is confined the liquid electrolyte 11. In general, the electrolyte should be water with a source of hydroxyl ions sufficient to raise the pH to 8 or above, preferably in the range 8–12. In one particular embodiment the electrolyte was water adjusted to a pH of approximately 10 by $NH_4OH$. The solution was a 0.01 Normal $NH_4OH$ solution (approximately 1 ml $NH_4OH$ in 400 ml water), although a range of 0.0001 – 1 Normal could be utilized. Although any source of hydroxyl ions should produce essentially the same results, $NH_4OH$ is preferred since the cation does not have any adverse effect on the semiconductor or oxide.

The semiconductor material in this case was a slice of n-type Te-doped GaAs with an impurity concentration of approximately $1 \times 10^{18}$ $cm^{-3}$. The semiconductor, illustrated as 12 in FIG. 1, was attached to an oxidizable metal 14 such as Al and immersed in the electrolyte along with a slice of a noble metal, 13, such as platinum or gold, or a good quality graphite. Electrically coupled to material 12 and 13 is a d.c. current source 16 and variable resistor 17 which together function as a constant voltage source. The semiconductor 12 was made the anode and the conductor 13 the cathode of the system. It will be understood that a constant current source could be substituted for the constant voltage source of this embodiment. Included in the circuit are an ammeter 15 for measuring current and a voltmeter 18 for measuring the applied potential.

Figure 2:
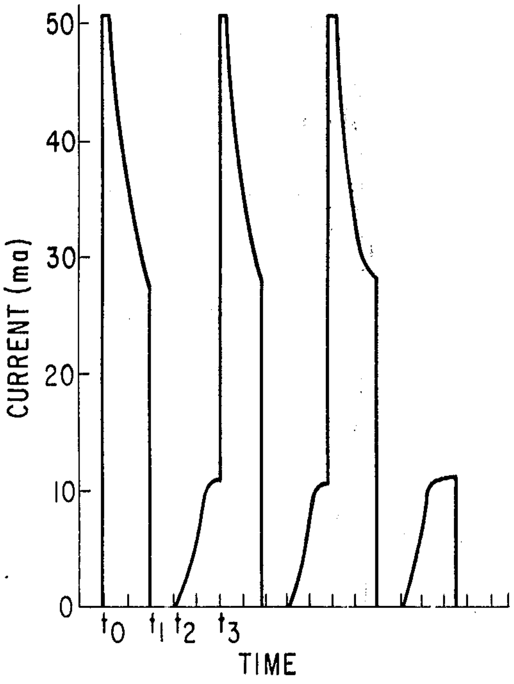
FIG. 2 is a graph of current through an electrolytic system as a function of time during various stages of manufacture in accordance with the same embodiment.

An initial bias of 120 volts was applied to the semiconductor for approximately 40 seconds and the bias was then lowered to 20 volts for approximately 60 seconds. This cycle was repeated twice and the power then turned off. The results of this operation are illustrated in the current-time curve of FIG. 2. When the initial bias of 120 volts was applied at $t_0$, a current in excess of 50 milliamps was sent through the cell. This current fell off as an amorphous oxide was grown on the surface of the semiconductor which increased the resistance in the cell in accordance with prior teachings (see U.S. patent application of B. Schwartz, Ser. No. 292,127, filed Sept. 25, 1972), now U.S. Pat. No. 3,798,139. After 40 seconds, at $t_1$, the applied potential was lowered to 20 volts, which resulted in a negligible current through the cell. However, at $t_2$, with the applied potential still at 20 V, the current began to increase. This increase was apparently due to a lowering of the resistance of the cell caused by a thinning of the previously grown oxide. This effect continued until time $t_3$ when the current reached a steady state value and substantially all the oxide that would dissolve had been dissolved, since new oxide was being grown at this potential as fast as it was dissolved. Since approximately two-thirds of the original oxide thickness represented consumed semiconductor material, it will be realized that a substantial portion of the original GaAs material had therefore been etched off. Repeating the cycle, as shown in FIG. 2, produced essentially the same results.

In one instance, the extent of the etching was localized by masking a GaAs slice with a photoresist mask so that oxidation and etching were confined to the exposed areas of the semiconductor. In other respects, the processing was as described above. After removal of the photoresist, talystep scanning of the surface revealed that the three cycles of oxidation and dissolution shown in FIG. 2 produced steps about 6,000 Å deep. It was estimated that the oxide dissolved at the rate of about 20 Å/sec.

The process was repeated under the same conditions with a slice of n-type, Se-doped GaP with an impurity concentration of approximately $10^{18}$ $cm^{-3}$. The results were substantially the same as described previously and illustrated in FIG. 2.

It is known that the electrolytic oxidation system of FIG. 1 forms a native, amorphous oxide on the surface of GaAs and GaP, the reactions apparently proceeding as follows:

$$GaAs + H_2O \rightarrow Ga_2O_3.H_2O + As_2O_3.H_2O \qquad (1)$$

$$GaP + H_2O \rightarrow Ga_2O_3.H_2O + P_2O_5.H_2O \qquad (2)$$

It is believed that the amorphous nature of the oxide is caused by the mixture of the product of the group III element and group V element. Consequently, it is expected that similar oxides will be formed not only on all compounds containing appreciable amount of gallium (at least 5 percent), but also on all other III-V compound semiconductors including ternary and quaternary compounds. Materials on which this process should be useful therefore include AlGaAs, AlGaP, InGaP, InGaAs, GaAsP, InSb, InAs, InP, and mixtures thereof.

In analyzing the mechanisms of this method, it was realized that when an n-type semiconductor is used as the anode in an electrolytic system a reverse-biased Schottky diode is established. Utilizing this fact along with Ohm's Law and Faraday's Law, and the fact that the applied potential is divided into basically three components dropped across the semiconductor, the growing oxide, and the oxide-electrolyte interface, the following equation was derived:

$$V_{ox} = (V_a - V_b - V_s)\left(1 - \frac{R}{r + R}\right) \qquad (3)$$

where $V_a$ is the voltage applied by the voltage source, $V_b$ is the voltage drop across the depletion region in the semiconductor (the breakdown voltage), $V_{ox}$ is the voltage drop across the growing oxide, $V_s$ is the voltage drop at the electrolyte/oxide interface, R is the resistance of the solution and $r$ is the resistance of the oxide. $V_{ox}$ may be thought of as the portion of the applied potential which is available for growing the oxide and when this value goes to a sufficiently low value, which is thought to be 10 volts or below, oxide growth stops and dissolution begins. One useful applied potential for achieving dissolution, therefore, could be one which is no more than 10 volts above the breakdown voltage of the semiconductor (which potential would give minimal oxidation of the bare semiconductor surface). The latter value will, of course, depend on the semiconductor material, its thickness and the impurity concentration, but can be calculated according to known techniques. The breakdown voltage for the GaAs slice used in the above experiments, for example, was approximately 4.5 volts/cm. It should also be realized that it is not necessary to decrease the applied potential to the value which will give no oxidation of the semiconductor surface. All that is really necessary to get dissolution is to decrease the applied potential at a particular time to a value which will not oxidize to as great a thickness as the oxide already on the semiconductor. As long as no further oxidation occurs at this low potential (i.e., the electric field between the surface and solution is small), dissolution of the oxide will occur. Dissolution will then continue until the oxide is thinned sufficiently to increase the field over the oxidation threshold and new oxide is formed as fast as it is being dissolved. (This appears to be the phenomenon responsible for the steady state portions of the curve in FIG. 2).

Figure 3:
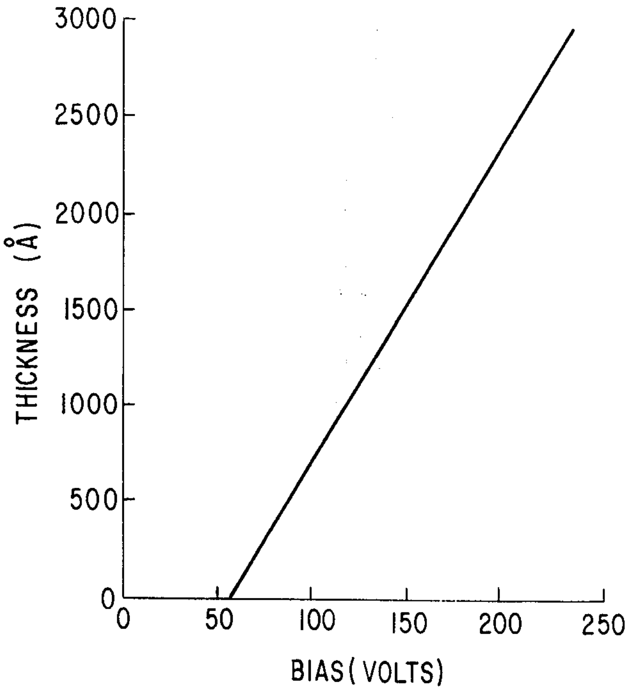
FIG. 3 is a graph of the oxide thickness as a function of applied voltage in accordance with the same embodiment.
Figure 4:
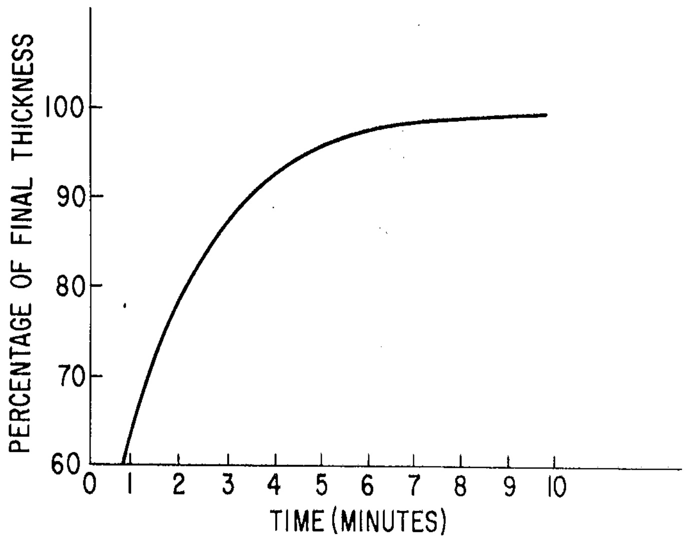
FIG. 4 is a graph of the expected percentage of oxide thickness grown as a function of time in accordance with the same embodiment.

In accordance with the invention, therefore, the skilled artisan is free to choose a wide range of parameters for oxidation and etching. The choice will depend on the device structure to be treated, the amount of material which is to be removed and the time in which it is desired to complete the process. Some guides to implementing the process can be gleaned from FIGS. 3 and 4. FIG. 3 is an idealized graph of oxide thickness as a function of voltage applied to the electrolytic system for oxidation of GaAs in the electrolyte of water at pH = 10. It will be seen that if the oxide is permitted to grow to its self-limiting value, it is expected that approximately 20 A of oxide is formed per volt. Thus, for example, if an initial voltage of 175 V is applied, an oxide approximately 2000 A thick is grown. If then the applied potential is dropped to 125 V, the oxide will dissolve until it is thinned to approximately 1,000 A in thickness. Since two-thirds of the initial oxide grown is consumed semiconductor material, this cycle etches off approximately 660 A of the semiconductor. In many applications, it will be desirable to cut off the oxidation portion of the cycle before the limiting oxide thickness is formed in order to limit the time the structure is in the electrolyte. For example, if it is desired to oxidize and etch only a selected portion of a semiconductor surface, a photoresist mask may be formed on the surface. (See U.S. patent application of F. Ermanis and B. Schwartz, Ser. No. 440,657, filed on an even date herewith.) This photoresist will begin to dissolve after approximately a few minutes in the electrolyte and so it is desirable to keep the time of oxidation and etching to a minimum. Reference can therefore be made to FIG. 4 which is a prediction of percentage of oxide thickness as a function of time for the oxidation of GaAs for an applied potential of 100 volts based on data from oxidation in $H_2O_2$. This graph indicates how much oxide can be expected if the oxidation is cut off before the steady state is reached and consequently is a measure of the extent of oxidation and etching for various time periods. It is expected that the curves should look the same for other potentials.

The time during which the dissolution is performed can be determined most conveniently by monitoring the current through the cell in accordance with FIG. 2. Once the current reaches its steady state value for this lower potential, e.g., at $t_3$, the dissolution rate will fall to a value which is equal to the rate of oxide growth and the system should be returned to its higher potential to grow more oxide. The magnitude of the lower potential for dissolution, as indicated above, can vary widely. It appears, however, that in order to achieve an effective rate of dissolution during reasonable periods of time, the lower potential should be at least 10 volts less than the higher potential. For maximum efficiency, the difference should be at least 100 volts.

It will be realized that the inventive method could be performed with a constant current source as well as a constant voltage source. In such a case, Equation (3) still applies, with $V_a$ being given by:

$$V_a = KI^2 t + IR \quad (4)$$

where K is a constant obtained from Faraday's Law, I is the applied current and $t$ is time. In such an arrangement, the applied voltage could be monitored as was the current for the case illustrated in FIG. 2. It is believed that the minimum current differential useful in this arrangement is 5 milliamps/$cm^2$. Further application of the invention to this arrangement is straightforward and therefore not discussed.

In general, therefore, it will be appreciated that the invention involves establishing a first electric field between the surface of the semiconductor and the electrolyte (whether by a constant voltage or constant current) which is sufficient to oxidize, and then establishing a second electric field between the surface and the electrolyte, i.e., across the grown oxide, (whether by lowering the potential or current) which is insufficient to grow the oxide as fast as it dissolves.

Figure 5A:
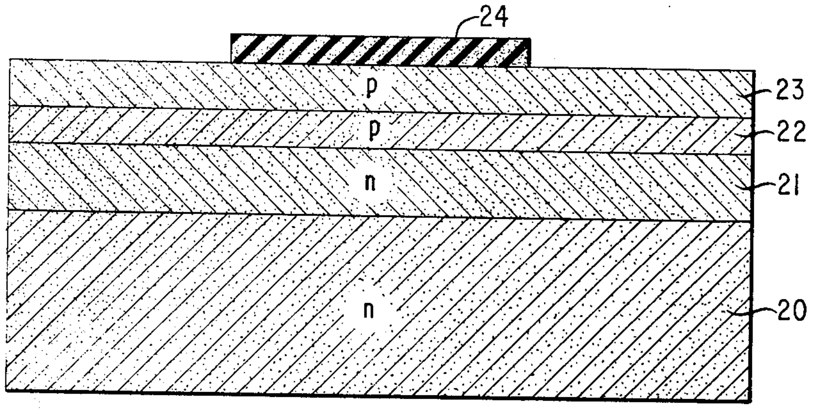
FIGS. 5A - 5C are cross-sectional views of a device during various stages of manufacture in accordance with a further embodiment of the invention.
Figure 5B:
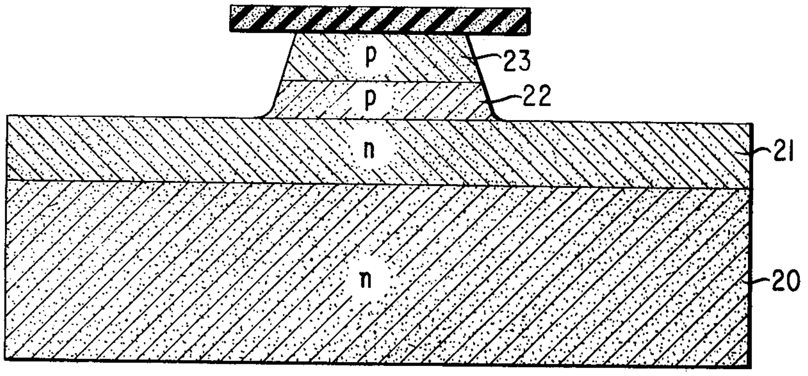
Figure 5C:
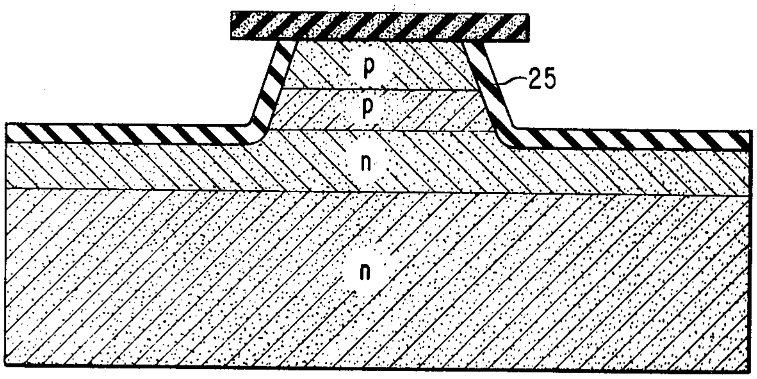

It should be clear that the above method has many device applications, one of which is illustrated in FIGS. 5A-5C. FIG. 5A shows a standard GaAs double heterostructure starting structure useful for an injection laser. It comprises a substrate of n-type GaAs, 20, with a layer grown thereon, usually by liquid phase epitaxy, of n-type AlGaAs 21. Grown on the latter is a layer of p-type GaAs, 22. The top layer, 23, is p-type AlGaAs. It is assumed for this example that layer 21 is 7.82 $\mu$m thick, layer 22 is approximately 0.7 $\mu$m thick and layer 23 is approximately 1.3 $\mu$m thick.

It is desirable for various reasons to form a mesa with this structure for either an active device or a passive waveguide. To this end, as shown in FIG. 5A, a mask, 24, is first formed on the surface of the device covering the area which will comprise the mesa. The material of the mask may be a wax such as glycol phthalate. The mask may be defined by placing a metal mask on the surface covering the area to be etched, depositing the wax thereon and removing the metal mask to leave the wax over the area which will comprise the mesa. The structure may then be placed in the electrolytic system of FIG. 1. If a potential of 175 volts is applied to the system, approximately 2000 A of oxide should grow on the exposed surface after about 10 minutes. If the voltage is then lowerd to 20 volts, the oxide will dissolve, thereby etching off about 1333 A of the exposed GaAs layer. If this process is repeated fifteen times, layers 22 and 23 should be etched away as illustrated in FIG. 5B. Then, the potential is returned to 175 volts to grow an oxide 25 on the etched surface as shown in FIG. 5C and the device is removed from the electrolyte. The oxide remaining on the surface should provide passivation of the exposed junctions. Of course, this example assumes that the mask will not be dissolved during the time of immersion in the electrolyte. If dissolution does not occur, the oxidation portion of the cycle can be reduced and the number of cycles increased, which will result in an overall shortening of the process time (since it is expected that approximately 90 percent of the oxide grows in the first 2 minutes).

A useful range of applied potential appears to be 5 – 175 volts. Above 175 volts, the oxide grown does not appear to be uniform. However, such a situation can be remedied if a pulsed d.c. potential is used.

Although the invention has been described above in terms of room temperature operation, it should be clear that the electrolyte can be heated up to temperatures including its boiling point. This will cause an increased oxidation and etching rate.

Various additional modifications will become apparent to those skilled in the art. All such variations which basically rely on the teachings through which the invention has advanced the art are properly considered within the spirit and scope of the invention.

What is claimed is:

1. A method for sequentially oxidizing and etching the surface of a compound semiconductor comprising a material selected from the group consisting of GaAs, GaP, AlGaAs, AlGaP, InGaP, InGaAs, GaAsP, InSb, InP and InAs comprising the steps of:

making the semiconductor the anode in an electrolytic cell wherein the electrolyte comprises water and an amount of $NH_4OH$ sufficient to set the pH of the electrolyte to within the range 8–12;

establishing an electric field between said semiconductor and said electrolyte of a first magnitude sufficient to grow an oxide into the surface of the semiconductor;

lowering the electric field to a second magnitude initially insufficient to grow any further oxide into said surface so as to dissolve a portion of the oxide grown into said surface; and establishing a third magnitude of electric field sufficient to grow further oxide into said surface when the rate of dissolution of the oxide is approximately equal to the rate of formation of oxide into said surface at said second magnitude of electric field.

2. The method according to claim 1 wherein the first and third magnitude of electric field are established by applying a first constant potential to said cell and the second magnitude of electric field is established by applying a second constant potential to said cell.

3. The method according to claim 1 wherein the first and third magnitude of electric field are established by applying a first constant current to said cell and the second magnitude of electric field is established by applying a second constant current to said cell.

4. The method according to claim 2 wherein the difference between the first potential and the second potential is at least 10 volts.

5. The method according to claim 2 wherein the difference between the first potential and the second potential is at least 100 volts.

6. The method according to claim 3 wherein the difference between the first current and the second current is at least 5 milliamps/$cm^2$.

7. The method according to claim 1 wherein the electrolyte is held at the boiling point.

8. A method for thinning a compound semiconductor comprising a material selected from the group consisting of GaAs, GaP, AlGaAs, AlGaP, InGaP, InGaAs and GaAsP comprising the steps of:

making the semiconductor the anode in an electrolytic cell wherein the electrolyte comprises water and an amount of $NH_4OH$ sufficient to set the pH of the electrolyte to within the range 8–12;

applying a first potential to said cell of sufficient magnitude so as to grow an oxide into the surface of the semiconductor;

applying a second potential to said cell which is lower than said first potential and which is initially insufficient to grow any further oxide into said surface so as to dissolve a portion of the oxide grown into said surface;

applying a third potential to said cell sufficient to grow further oxide into said surface when the rate of dissolution of the oxide is approximately equal to the rate of formation of oxide into said surface at said second potential; and repeating said oxidation and dissolution until a desired thickness is achieved.

9. The method according to claim 8 further comprising the step of re-applying a magnitude of potential sufficient to grow further oxide into said surface subsequent to reaching the desired thickness so as to grow a passivating oxide into said surface.

10. A method for thinning of a semiconductor material comprising GaAs comprising the steps of:

making the semiconductor the anode in an electrolytic cell wherein the electrolyte comprises water and an amount of $NH_4OH$ sufficient to set the pH of the electrolyte to within the range 8–12;

applying a first potential to said cell of sufficient magnitude so as to grow an oxide into the surface of the semiconductor;

applying second potential to said cell which is lower than said first potential and which is initially insufficient to grow any further oxide into said surface so as to dissolve a portion of the oxide grown into said surface;

applying a third potential to said cell sufficient to grow further oxide into said surface when the rate of dissolution of the oxide is approximately equal to the rate of formation of oxide into said surface at said second potential; and repeating said oxidation and dissolution until a desired thickness is reached.

11. The method according to claim 10 wherein the third potential is approximately equal to the first potential.

* * * * *